(12) United States Patent
Fanini et al.

(10) Patent No.: US 6,529,833 B2
(45) Date of Patent: Mar. 4, 2003

(54) RESERVOIR MONITORING IN A LAMINATED RESERVOIR USING 4-D TIME LAPSE DATA AND MULTICOMPONENT INDUCTION DATA

(75) Inventors: Otto N. Fanini, Houston, TX (US); Eric Withjack, Santa Rosa, CA (US); Sven Treitel, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/059,377

(22) Filed: Jan. 29, 2002

(65) Prior Publication Data

US 2002/0128777 A1 Sep. 12, 2002

Related U.S. Application Data

(63) Continuation-in-part of application No. 09/539,053, filed on Mar. 30, 2000, which is a continuation-in-part of application No. 09/474,049, filed on Dec. 28, 1999, which is a continuation-in-part of application No. 09/222,967, filed on Dec. 30, 1998, now abandoned.
(60) Provisional application No. 60/160,943, filed on Oct. 22, 1999.

(51) Int. Cl.$^7$ .................................................. G01N 1/00
(52) U.S. Cl. .............................................. 702/7; 703/5
(58) Field of Search ............................... 702/7, 13, 14, 702/16; 382/159; 367/32, 57; 703/5, 10

(56) References Cited

U.S. PATENT DOCUMENTS

| | | | |
|---|---|---|---|
| 4,817,060 A | * 3/1989 | Smith | 367/52 |
| 4,969,130 A | 11/1990 | Wason et al. | 367/73 |
| 5,444,619 A | * 8/1995 | Hoskins et al. | 702/13 |
| 5,724,311 A | 3/1998 | Laurent et al. | 367/57 |
| 6,253,848 B1 | 7/2002 | Reimers et al. | 166/254.1 |

OTHER PUBLICATIONS

Gary Mavko et al.; *Tools for Seismic Analysis in Porous Media*, The Rock Physics Handbook, Cambridge University Press, pp. 60–69.

L. Y. Faust; *A Velocity Function Including Lithologic Variation*, Geophysics, vol. XVIII, Apr., 1953, No. 2, pp. 271–288.

Martin Landro, *Discrimination between pressure and fluid saturation changes from time–lapse seismic data*, Geophysics, vol. 66, No. 3, (May–Jun. 2001), pp. 836–844, 11 Figs, 1 Table.

Hans B. Helle et al.; *Porosity and permeability prediction from wireline logs using artificial neural networks: a North Sea case study*, Geophysical Prospecting, 2001, 49, pp. 431–444.

Ali Tura et al.; *Estimating pressure and saturation changes from time–lapse AVO data*, SEG 1999 Expanded Abstracts.

J.J. Shyeh et al.; *Interpretation and Modeling of Time–Lapse Seismic Data: Lena Field, Gulf of Mexico*, SPE 56731, 1999 SPE Annual Technical Conference and Exhibition, Houston, Texas, Oct. 3–6, 1999, pp. 1–5, 13 Figures.

* cited by examiner

*Primary Examiner*—Edward Lefkowitz
*Assistant Examiner*—Victor J. Taylor
(74) *Attorney, Agent, or Firm*—Madan, Mossman & Sriram, P.C.

(57) ABSTRACT

Time lapse seismic measurements of a laminated reservoir including sands and shales are processed to determine changes in the laminated reservoir. An initial petrophysical model is obtained at a wellbore from measurements made with a multicomponent resistivity logging tool. Changes in the amplitude versus offset behavior of the reflections from the top of the reservoir are indicative of changes in fluid saturation and/or formation pressure.

21 Claims, 3 Drawing Sheets

RESERVOIR MONITORING IN A LAMINATED RESERVOIR USING 4-D TIME LAPSE DATA AND MULTICOMPONENT INDUCTION DATA

CROSS-REFERENCES TO RELATED APPLICATIONS

This application is a continuation-in-part of U.S. patent application Ser. No. 09/539,053 filed on Mar. 30, 2000 which is a continuation-in-part of U.S. patent application Ser. No. 09/474,049 filed on Dec. 28, 1999 which is a continuation in part of U.S. patent application Ser. No. 09/222,967 filed on Dec. 30, 1998 (now abandoned). U.S. patent application Ser. No. 09/474,049 further claims priority from U.S. Provisional Application Ser. No. 60/160,943 filed on Oct. 22, 1999. The contents of all these applications are incorporated herein by reference.

BACKGROUND OF THE INVENTION

1. Field of the Invention

The invention is related generally to the field of interpretation of reservoir monitoring using time-lapse seismic measurements. More specifically, the invention is related to methods for monitoring of reservoirs comprising laminated rocks.

2. Background of the Art

As is well known to geophysicists a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to be received by seismic sensors located at designated stations at or near the surface of the earth. The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing. The travel-time lapse between the emission of a wavefield by a source and its reception by a receiver after reflection, is a measure of the depths of the respective reflecting earth formations.

The seismic survey stations are preferably distributed in a regular grid over an area of interest with inter-station spacings on the order of 25 meters. The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey may be formatted side-by-side to form an analog of a cross section of the earth. Seismic sections from a plurality of intersecting lines of survey distributed over an area of interest would provide data for three-dimensional representation of a subsurface volume of the earth.

Wavefield reflection from a subsurface interface depends on the acoustic characteristics of the rock layers that define that interface such as density and wavefield propagation velocity. In turn those characteristics depend inter alia on the rock type, rock permeability and porosity, fluid content and fluid composition. In a subsurface reservoir, a fluid transition or interface between gas and oil, or oil and water may act as a weak reflecting surface to generate the so-called bright spots sometimes seen on seismic cross sections. It is reasonable to expect that a change in the level or the characteristics of the reservoir fluids will create a change in the seismic signature associated with the reservoir. Thus, time-lapse or 4-D seismic data acquisition, that is, the act of monitoring the regional seismic signature of a reservoir over a long period of time would assist in tracking the depletion of the reservoir or the advance of thermal front in a steam-flooding operation.

Wason (U.S. Pat. No. 4,969,130) discloses a system of monitoring the fluid contents of a petroleum reservoir, wherein a reservoir model is employed to predict the fluid flow in the reservoir, includes a check on the reservoir model by comparison of synthetic seismograms with the observed seismic data. If the synthetic output predicted by the model agrees with the observed seismic data, then it can be assumed that the reservoir model correctly represents the reservoir. If not then the reservoir model, in particular its reservoir description, is updated until it predicts the observed seismic response. The seismic survey may be periodically repeated during the productive life of the reservoir and the technique used to update the reservoir model so as to ensure that the revised reservoir description predicts the observed changes in the seismic data and hence reflects the current status of fluid saturations.

Laurent (U.S. Pat. No. 5,724,311) discloses a method of monitoring of underground reservoirs. Seismic sources and receivers are installed in a fixed position on the production site, so as to have time stable operating conditions of identical source and receiver characteristics. A plurality of seismic sources are positioned at the surface or buried beneath the surface, on either side of a production well, and at least one array of receivers are positioned at the surface or in at least one well. Explosive sources, hydraulic sources, or electromechanical sources, etc, can be used. The seismic reflection from the underground reservoirs changes with time due to changes in the reservoir conditions such as fluid saturation.

Reimers et al. (U.S. Pat. No. 6,253,848) having the same assignee as the present application teaches the use of permanently installed sensors in a plurality of wellbores for reservoir monitoring. The source(s) may be at the surface or in a wellbore, and both seismic reflection as well as seismic transmission tomographic methods may be used for monitoring reservoir changes.

In reservoir monitoring, two properties that are of considerable interest are the fluid saturation and the pressure of the reservoir. Fluid saturation affects seismic data because of changes in the impedance of the reservoir when one fluid is partially or fully replaced by another fluid. This could be the replacement of heavy oil by steam in a secondary recovery operation, replacement of gas by water or oil in a gas reservoir, replacement of oil by water in an oil reservoir, etc.

When a rock is loaded under an increment of compression, such as from a passing seismic wave, an increment in pore pressure occurs which resists the compression and therefore stiffens the rock. In a classic paper, Gassman predicts the increase in effective modulus of a saturated rock by the following relations:

$$\frac{K_{sat}}{K_0 - K_{sat}} = \frac{K_{dry}}{K_0 - K_{dry}} + \frac{K_{fl}}{\phi(K_0 - K_{fl})}, \quad \mu_{sat} = \mu_{dry} \quad (1)$$

where
$K_{dry}$=effective bulk modulus of dry rock,
$K_{sat}$=effective bulk modulus of the rock with pore fluid
$K_{fl}$=effective bulk modulus of the fluid
$K_0$=bulk modulus of mineral material making up rock φ=porosity
$\mu_{dry}$=effective shear modulus of dry rock
$\mu_{sat}$=effective shear modulus of rock with pore fluid.

The relationships given be Gassman are valid in the low frequency limit.

Biot used a model incorporating mechanisms of viscous and inertial interactions between the fluid and the rock matrix and came up with a similar result in the low frequency limit. The results derived by Biot are frequency dependent and include a coupling coefficient between the fluid and the rock as well as a term related to the tortuosity of the fluid paths within the rock matrix.

Prior art methods for interpretation of seismic reflection amplitude changes in a reservoir have generally relied on eq. (1). If the matrix and fluid properties are known, then from a knowledge of the compressional and shear velocities for a first fluid saturation, all the terms in eq. (1) can be determined. A change in seismic reflectivity over time is used to determine a change in velocities and hence the fluid saturation. A commonly used method relies on the Amplitude-versus-offset (AVO) variation of reflection seismic amplitudes for compressional and/or shear wave data, generally described by Zoeppritz's equations. The AVO effects are measured and based on an initial knowledge of the elastic modulii of the rock and its constituent fluids. Modeling results using the Gassman and Zoeppritz equations are used to derive the fluid saturation.

In addition to the fluid saturation effects, it is well known that elastic modulii of rocks are dependent upon the effective stress. The effective stress is defined as the difference between the overburden stress and the formation fluid pressure. As the reservoir is depleted, the formation fluid pressure drops so that the effective stress and the elastic modulii of the rocks increases. Landro (Geophysics, vol. 66, No. 3, pp 836–844), the contents of which are incorporated herein by reference, derives explicit expressions for computing saturation-and pressure-related changes from time-lapse seismic data. As a simplification to fitting the AVO behavior over a range of offsets, input is near-and far-offset stacks for the baseline seismic survey and the repeat survey. Landro shows that the method is successful in a segment where pressure measurements in two wells verify a pore- pressure increase of 5 to 6 MPa between the baseline survey and the monitor survey. The estimated saturation changes also agree well with observed changes, apart from some areas in the water zone that are mapped as being exposed to saturation changes (which is unlikely).

A significant number of hydrocarbon reservoirs include deep water turbidite deposits that consist of thin bedded, laminated sands and shales. In such reservoirs, the wavelengths of seismic signals is much larger than the layer thicknesses. For example, with a frequency of 50 Hz and a velocity of 5 km/s, the wavelength for a compressional wave is 100 m. This is much longer than layer thicknesses commonly encountered in laminated reservoirs. Commonly, a laminated reservoir comprises thin sand and shale layers while the seal for the reservoir is a thick shale. In such cases, the method described by Landro may encounter problems for several reasons. One reason is that attributing the entire change in the reflectivity of seismic waves (even when the effects of pore pressure changes are small) to fluid saturation changes in the reservoir can lead to errors because the fluid saturation changes occur predominantly in the sands and not in the shale. A second reason is that a laminated sequence exhibits transverse isotropy and the AVO behavior of seismic reflections may not be accurately described by the standard form of the Zoeppritz equations that were derived for plane interfaces between two isotropic half spaces. As would be known to those versed in the art, in a transversely isotropic (TI) medium, there is a single symmetry axis and the medium has a complete rotational symmetry about the axis. The properties of the medium in a plane normal to the symmetry axis do not change with direction while they are different from properties along the symmetry axis. A laminated formation typically has a symmetry axis normal to the bedding plane.

There is a need for a method of determination of changes in reservoir conditions in laminated reservoirs. Such a method should preferably take into account the effect of fluid pressure changes as well as any possible anisotropy in the reservoir. The present invention satisfies this need.

SUMMARY OF THE INVENTION

The present invention is a method of determining changes in fluid saturation and/or pressure of a laminated reservoir. A multicomponent resistivity logging tool is used for obtaining resistivity measurements indicative of properties of the formation at a wellbore. These resistivity data in combination with other measurements described below are processed to give a petrophysical model of the reservoir at the wellbore. The petrophysical model produces a fluid saturation estimate for the sand component of the reservoir. Acoustic measurements at the wellbore, combined with the above resistivity log derived water saturation data, are then used to define the elastic properties of the reservoir at the wellbore. These are next extrapolated away from the well. Changes in the AVO characteristics of the reservoir over time are indicative of changes in the fluid saturation and/or the pressure. These changes in the AVO characteristics are interpreted assuming that all the fluid substitution takes place within the sand component of the reservoir.

BRIEF DESCRIPTION OF THE DRAWINGS

The present invention is best understood by reference to the following figures wherein like numerals refer to like components.

DETAILED DESCRIPTION OF THE INVENTION

Figure 1:
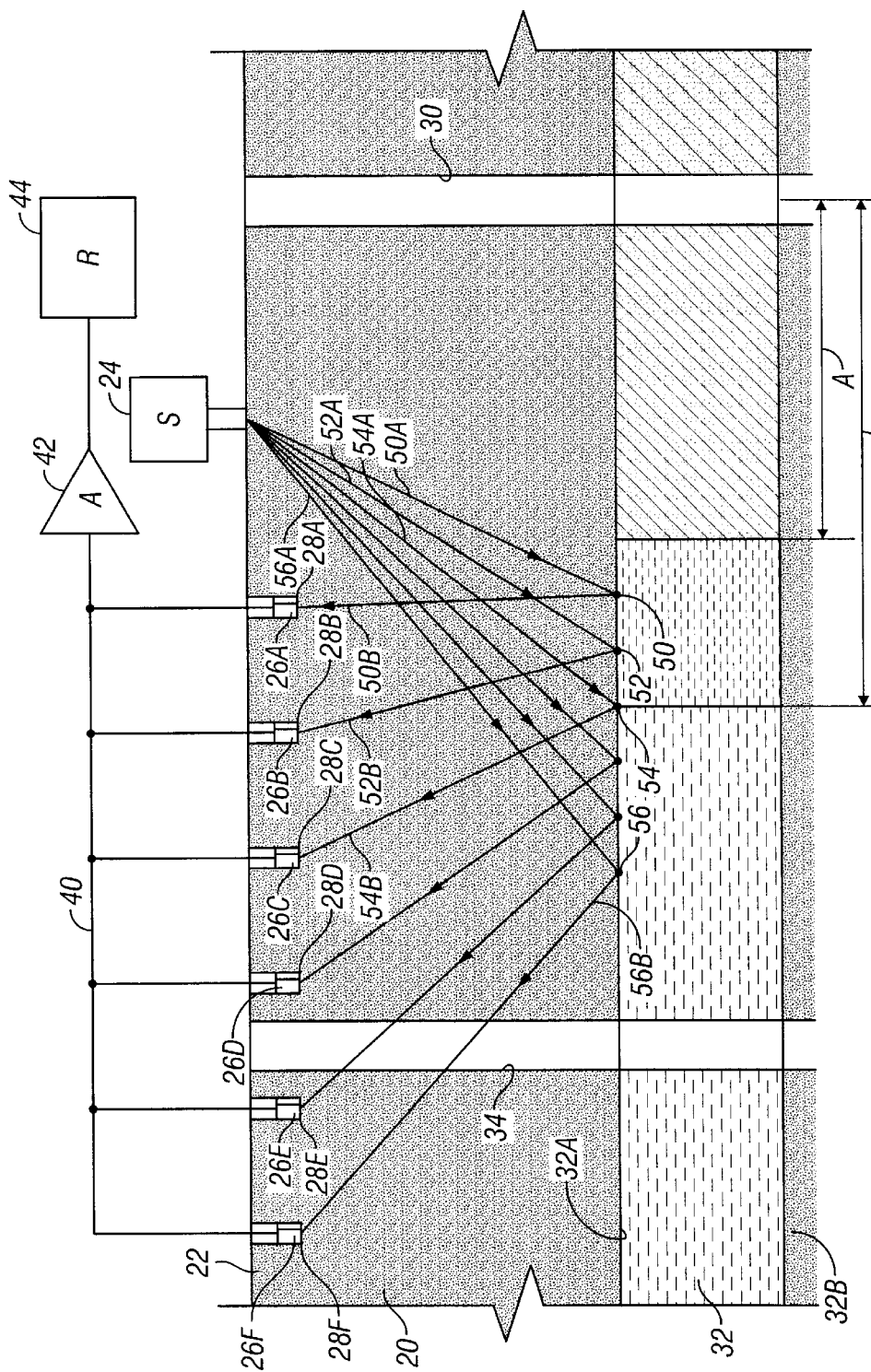
FIG. 1. (Prior Art) Schematically illustrates the use of reflection seismology for determination of fluid distribution in a reservoir.

FIG. 1 (prior art) schematically shows an example of a configuration using reflection seismology, for this invention. Shown are a portion of the earth 20 including the surface 22. There is a bore hole 30 drilled in a conventional manner from the surface 22 into a reservoir 32. Reservoir 32, bounded by geologic interfaces 32A and 32B, contains a gas saturated zone in an area defined by radius A, an oil saturated zone in the interval between radius A and radius B, and a water saturated zone beyond radius B. The water saturation in the zone beyond radius B may be natural, or may be injected through a second borehole 34.

A plurality of stable seismic sensors, typified by sensors 26A–26F, are permanently fixed in holes 28A–28F located on a uniform grid over, and normally extending beyond, the known limits of the reservoir 32. The seismic sensors may record motion in only the vertical direction or, in some embodiments, in all three directions. The seismic sensors are connected to a central recorder system 44 for the purposes of recording the seismic disturbances produced in response to excitation by the seismic sources 24. The seismic sources 24 are shown near the borehole 30.

In the particular example shown here, the borehole 30 is drilled in land and the sources may be of the vibrator type, and in any event must be capable of creating controlled seismic disturbances from each of a plurality of surface stations in turn. The output of the sensors 26A–26F is transmitted by cable 40 through amplifier 42 to recorder 44. The seismic instrumentation is conventional, well known, and is used in the conventional manner.

FIG. 1 also shows rays of the seismic waves produced by the source 24, such as 50A which reflects at point 50 on interface 32A and travels upwardly as ray 50B to sensor 16A, and others similarly reflecting at points 52, 54 and 56 on interface 32A. Of course, there will be similar reflections for each of the geologic interfaces beneath the survey area. Time lapse measurements are obtained by repeating the acquisition of seismic data over an extended period of time while producing hydrocarbons from the reservoir 32.

FIG. 1 is intended to show only an example of the acquisition system that may be used. If the borehole 30 is in a body of water, then the source and receivers may be deployed in the water. Alternatively, the cables may be deployed on the ocean bottom. If ocean bottom deployment is used, the receivers are preferably of the multicomponent type that are sensitive to three components of motion and, additionally, a pressure sensor. Such methods of deployment in the water or at the ocean bottom would be known to those versed in the art and are not described further.

In an alternative embodiment of the invention (not shown), the source may be deployed in another borehole and the receivers may be deployed in a borehole, at the surface, or at the ocean bottom. In all of these possible configurations of sources and receivers, a commonly used method of monitoring the reservoir is to measure the characteristics of seismic waves that are generated at the source, reflected at the top of the reservoir and received at the receivers. As would be known to those versed in the art, the reflection characteristics, specifically the amplitude, depend upon the difference in impedance between the reservoir 32 and the overlying formation (the "seal"). Typically, the seal is a thick shale of very low permeability that hinders the escape of hydrocarbons from the reservoir while the reservoir itself has relatively high permeability and porosity. The high porosity allows for accumulation of hydrocarbons in the pore spaces of the reservoir rock while the high permeability allows the hydrocarbons to be recovered from the reservoir at an economically profitable rate.

In prior art, measurements of the reservoir characteristics are made at the borehole 30 based on logging measurements and/or core samples. These are used to provide estimates of the initial condition of the reservoir in terms of its compressional and shear velocities and fluid saturation. This is used to provide a calibration of the seismic signals. Subsequent changes in the seismic reflection are interpreted in terms of changes in fluid saturation, or, in the case of Landro, to changes in fluid saturation and formation fluid pressure. The prior art methods of analyzing data acquired by time-lapse monitoring commonly characterize the reservoir as being a homogeneous medium and relate changes in the amplitude of reflected seismic waves to changes in the velocity of compressional and shear waves in the reservoir. There are numerous situations in which the assumption of homogeneity of the reservoir is not valid.

Figure 2:
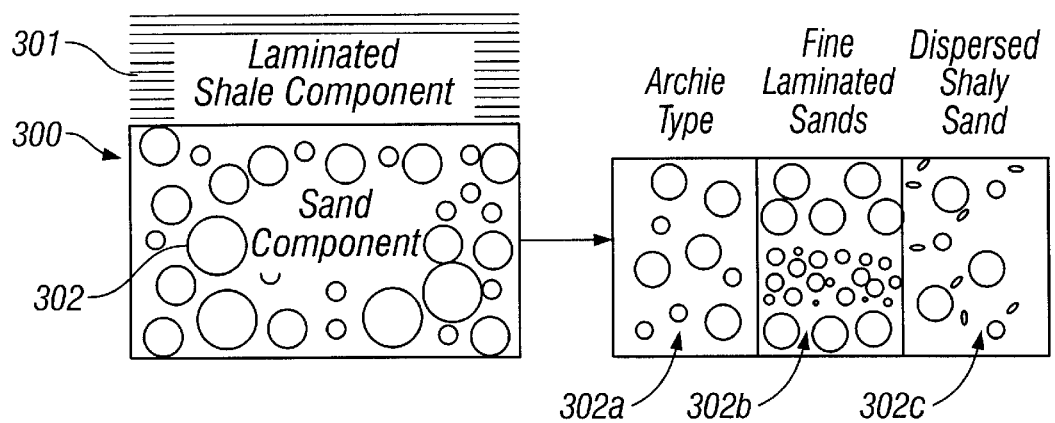
FIG. 2 is a schematic illustration of the components of the tensor petrophysical model of the present invention

Many reservoirs comprise a mixture of sands and shales wherein the thickness of the individual sands is much less than the wavelength of the seismic waves. This is schematically illustrated in FIG. 2 showing a laminated formation 300 comprising interbedded sand 301 and shale layers 302. For illustrative purposes, only a single sand and a single shale layer are shown for representing the overall makeup of the formation. The sand may further comprise a clean sand 303a having poor sorting (i.e., different grain sizes, known to those versed in the art as an Archie type sand), a fine laminated sand 303b that includes laminae of well sorted sand with differences in grain size between the individual laminae, and a dispersed shaly sand 303c having shale dispersed therein.

A commonly used method for determination of water saturation of reservoir rocks uses measurements of electrical resistivity of the earth formations. Various types of resistivity measurements may be made, including the so-called propagation resisitivity method and the induction logging method. As would be known to those versed in the art, a finely laminated sequence of layers having different resistivities exhibits a transverse isotropy on a larger scale where the wavelength of the electromagnetic wave is much greater than the layer thickness. This condition exists even for propagation resistivity tools that, e.g., operate at a frequency of 2 MHz; for induction logging tools that have frequencies of the order of 50 kHz to 200 kHz, the wavelengths are even longer. For such interrogating frequencies, the layered medium is characterized by a horizontal resistivity $R_h^*$ and a vertical resistivity $R_v^*$ given by:

$$R_v^* = \frac{1}{W} \sum_{W_i} R_i \Delta h \quad \text{and} \quad (2)$$

$$(R_h^*)^{-1} = \frac{1}{W} \sum_{W_i} \frac{\Delta h}{R_i} \quad (3)$$

where $W_i$ is a window used to average the resistivities, $\Delta h$ is the depth sampling interval of the electrodes, and $R_i$ is the measured resistivity for a given depth.

In this invention, the terms "horizontal" and "vertical" are to be understood in terms of reference to the bedding planes and the anisotropy axes of the subsurface formations, i.e., "horizontal" refers to parallel to the bedding plane, and "vertical" refers to vertical to the bedding plane. Where the beds of the formation are dipping, the anisotropy axis is taken to be the normal to the bedding plane.

As disclosed in U.S. patent application Ser. No. 09/539, 053 of Mollison et al filed on Mar. 30, 2000, measurements used with a specialized logging tool may be processed to determine the resistivities of the sand and shale components of a reservoir that may be depicted by FIG. 2. In addition, the water saturation in the sand component may also be estimated.

Figure 3:
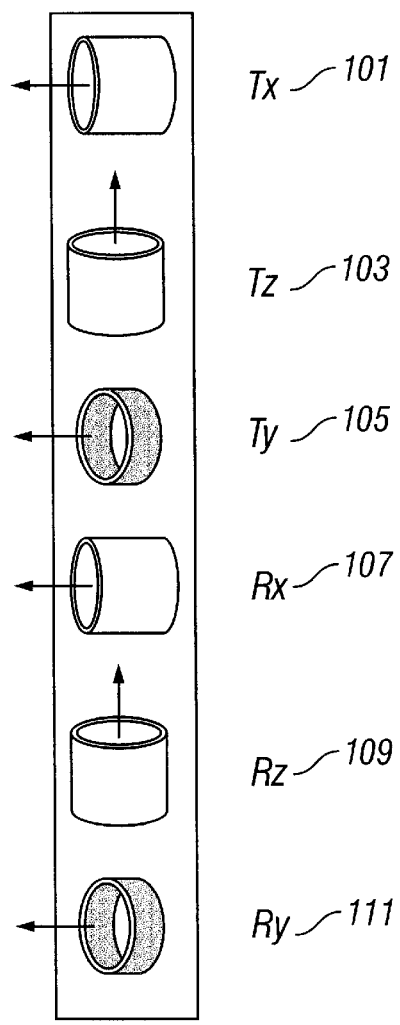
FIG. 3 is a schematic illustration of an exemplary multicomponent logging tool suitable for use with the method of the present invention.

This specialized logging tool is shown in FIG. 3. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In a preferred mode of operation of the tool, the $H_{xx}$, $H_{yy}$, $H_{zz}$, $H_{xy}$, and $H_{xz}$ components are measured, though other components may also be used. The first subscript refers to the transmitter orientation while the second subscript refers to the receiver orientation. As disclosed in Mollison, using these measurements in combination with other logging measurements, the resistivities and water saturation of the reservoir components shown in FIG. 2 may be determined. These additional logging measurements may include gamma ray measurements, resistivity imaging measurements, acoustic traveltime measurements, bulk density measurements, neutron porosity measurements, and NMR measurements.

Figure 4:
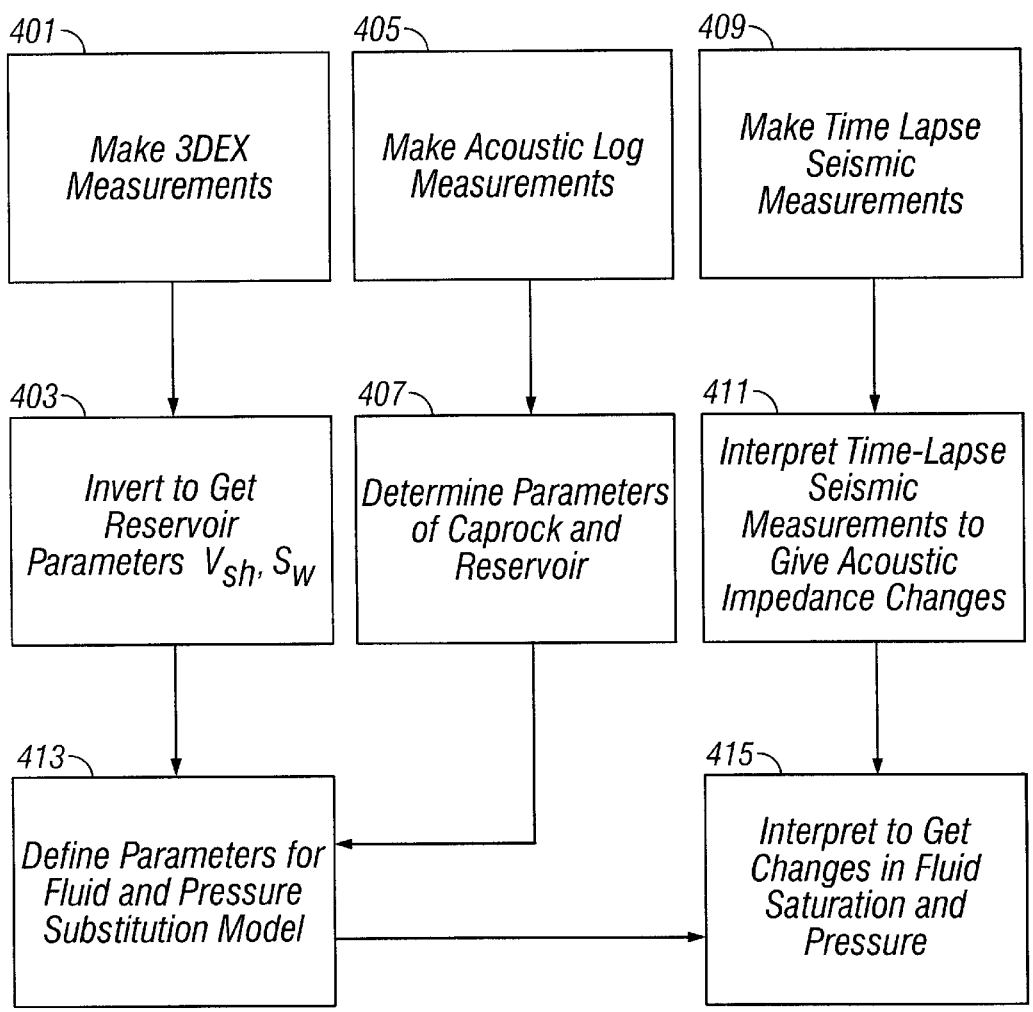
FIG. 4 is a flow chart illustrating the method of the present invention.

Turning now to FIG. 4, a flow chart of the preferred embodiment of the method of the present invention is shown. Using the 3DEX$^{SM}$ tool, electrical resistivity measurements are made 401. Using a method such as that taught by Mollison, and other measurements needed, the resistivity measurements are inverted to determine the reservoir parameters, specifically including the shale fraction $V_{sh}$ and the sand fraction $(1-V_{sh})$ within the reservoir and, most importantly, the fluid saturation $S_{w,sd}$ of the sand component 403. Acoustic log measurements are made over the interval including the caprock and the reservoir 405. These measurements include compressional and shear velocities. Compressional velocities may be obtained by any suitable prior art logging device while the shear velocities are preferably obtained using the XMAC$^{SM}$ logging tool of Baker Hughes. If shear velocity measurements are not obtainable with a logging tool, then empirical correlations between the $V_p/V_s$ ratios of sands and shales with the compressional velocity $V_p$ may be used. Such empirical data have been published, for example in J. P. Castagna, M. L. Batzle and T. R. Kan, "Rock physics-the link between rock properties and AVO response", in "Offset-Dependent Reflectivity", J. P. Castagna and M. M. Backus (Editors), SEG, p. 135–173, 1993. The porosity of the sand component $\phi$ is obtained from density-logs and knowledge of the grain density of the matrix of sand. This information is then used in the Gassman or other fluid substitution calculations. From a knowledge of the compressional and shear velocities, the density, and the above resistivity-log derived fluid saturation $S_{w,sd}$, the elastic modulii needed for the fluid substitution are determined. The invention makes the assumption that all of the fluid substitution takes place within the sand component of the reservoir while the shale does not have any significant change in its composition over the period of the time-lapse measurements. This is a reasonable assumption in view of the low permeability of the shale. In an optional embodiment of the invention, the elastic properties of the shale component may change due to changes in the effective stress.

Knowing the compressional and shear velocities in caprock and in the sand and shale components of the reservoir, the parameters of the fluid substitution model may be defined 413. These parameters include the density, bulk and shear modulus of the caprock, sand component of the reservoir and shale component of the reservoir. In addition, the initial fluid saturation of the sand component of the reservoir is necessary for interpretation of the time-lapse data.

The reflection coefficient for a plane wave at an interface between two semi-infinite media is given by the well-known Zoeppritz's equations. In a preferred embodiment of the invention, the time-lapse monitoring comprises making measurements of the reflected P-wave velocity for an incident P-wave (referred to as $R_{pp}$) at the interface between the caprock and the reservoir at a location away from the well. This provides useful information about the reservoir conditions. In a preferred embodiment of the invention, the initial fluid saturation away from the well is taken to be the same as the fluid saturation at the well. Alternatively, when geologic information is available, e.g., a fluid saturation at a second well away from the first well for the same reservoir, a suitable interpolation method may be used. In an optional embodiment of the invention, a similar interpolation may be carried out for the compressional and shear velocities of the caprock and the reservoir if suitable log measurements are available at two wells. Statistical interpolation methods would be known to those versed in the art and are not discussed further. Alternatively, an extrapolation may be done away from the wellbore. Both interpolation and extrapolation methods may further benefit from a knowledge of the geologic setting in which the reservoir rocks were deposited. For example, sands deposited in a body of water commonly become finer grained and less porous away from the shoreline.

In addition to monitoring the $R_{pp}$ reflection amplitude, measurement may also be made of the $R_{ps}$ reflection coefficient at the caprock-reservoir interface. Here, $R_{ps}$ is the reflection coefficient for a shear wave reflected from the interface for an incident compressional wave. This $R_{ps}$ may be estimated using inline detectors that, in a marine environment may be deployed on the ocean bottom. When both $R_{pp}$ and $R_{ps}$ are monitored, an overdetermined set of equations is obtained for estimating the unknown parameters. For illustrative purposes, the discussion of the present invention is limited to use of the $R_{pp}$ coefficient only. Those versed in the art would recognize that the $R_{ps}$ measurement alone is quite insensitive to changes in P-wave velocity and is thus unsuitable for use in the present invention.

The basic methodology in prior art and also in Landro is to represent the $R_{pp}$ by an approximation of the Zoeppritz equations of the form $$R_{pp}(\theta) \approx \frac{1}{2}\left(\frac{\Delta\rho}{\rho} + \frac{\Delta\alpha}{\alpha}\right) - 2\frac{\beta^2}{\alpha^2}\left(\frac{\Delta\rho}{\rho} + \frac{2\Delta\beta}{\beta}\right)\sin^2\theta + \frac{\Delta\alpha}{2\alpha}\tan^2\theta \quad (4)$$

where $R_{pp}$ is the reflection coefficient, $\theta$ is the angle of incidence, $\Delta\alpha$ is the difference $(\alpha_2-\alpha_1)$ in compressional velocities between the caprock and the reservoir rock, $\Delta\beta$ is the difference in shear velocities $(\beta_2-\beta_1)$ between the caprock and the reservoir, $\Delta\rho$ is the difference in density. The terms $\alpha$, $\beta$ and $\rho$ are the average of the compressional velocities, shear velocities and the densities respectively. Those versed in the art would recognize that other approximations of the Zoeppritz equations may also be used. The particular forms used here are valid for small contrasts between the caprock and the reservoir rock. Those versed in the art would also recognize that for large contrasts, these expressions are not valid and higher order terms in $\theta$ may be necessary. This is not a limitation of the method of the present invention as the explicit, large contrast forms of the equations could also be used. Those versed in the art would recognize that other approximations of Zoeppritz's equations may also be used with comparable results.

After fluid substitution and pressure changes in the reservoir rock, the angle dependent reflection coefficient takes a similar form denoted by $$R'_{pp}(\theta) \approx \frac{1}{2}\left(\frac{\Delta\rho'}{\rho'} + \frac{\Delta\alpha'}{\alpha'}\right) - \frac{2\beta'^2}{\alpha'^2}\left(\frac{\Delta\rho'}{\rho'} + \frac{2\Delta\beta'}{\beta'}\right)\sin^2\theta + \frac{\Delta\alpha'}{2\alpha'}\tan^2\theta \quad (5)$$

where $$\Delta\alpha' = \alpha'_2 - \alpha_1 = \alpha_2 + \Delta\alpha^F + \Delta\alpha^P - \alpha_1 = \Delta\alpha + \Delta\alpha^F + \Delta\alpha^P$$

$$\Delta\beta' = \Delta\beta + \Delta\beta^F + \Delta\beta^P$$

and $$\Delta\rho' = \Delta\rho + \Delta\rho^F + \Delta\rho^P \tag{6}$$

In eq. (6) $\Delta\alpha^F$ is the parameter contrast from fluid changes and can be represented as $$\Delta\alpha^F = \alpha_2[S_w(t_2)] - \alpha_2[S_w(t_1)] \tag{7}$$

i.e., as a related to the difference in compressional wave velocity of the reservoir caused by fluid saturation changes between the initial time $t_1$ and a second time $t_2$ with similar expressions for $\Delta\beta^F$ and $\Delta\rho^F$, while $\Delta\alpha^P$, $\Delta\beta^P$ and $\Delta\rho^P$ refer to parameter changes caused by changes in stress alone.

Landro shows that for fluid substitution alone, $$\Delta R^F(\theta) \approx \frac{1}{2}\left(\frac{\Delta\rho^F}{\rho} + \frac{\Delta\alpha^F}{\alpha}\right) + \frac{\Delta\alpha^F}{2\alpha}\tan^2\theta \tag{8}$$

where $\Delta\rho^F$ is the density change due to fluid substitution. Landro also derives an approximate relation in reflectivity changes caused by changes in fluid pressure alone in the form $$\Delta R^P(\theta) \approx \frac{1}{2}\frac{\Delta\alpha^P}{\alpha} - \frac{4\beta^2}{\alpha^2}\frac{\Delta\beta^P}{\beta}\sin^2\theta + \frac{\Delta\alpha^P}{\alpha}\tan^2\theta \tag{9}$$

Eqs. (8) and (9) show that the change in reflectivity may be expressed as a change in a zero offset term and a change in a gradient term with θ. In general, the change in reflectivity obtained by subtracting eq. (5) from eq. (4) may be represented in the form $$\Delta R_{pp}(\theta) \approx A - B\sin^2\theta \tag{10}$$

where A and B are given by $$A = \frac{1}{2}\left(\frac{\Delta\rho'}{\rho'} + \frac{\Delta\alpha'}{\alpha'}\right) - \frac{1}{2}\left(\frac{\Delta\rho}{\rho} + \frac{\Delta\alpha}{\alpha}\right) \tag{11}$$

$$B = \frac{2\beta'^2}{\alpha'^2}\left(\frac{\Delta\rho'}{\rho} + \frac{\Delta\beta'}{\beta'}\right) - \frac{2\beta^2}{\alpha^2}\left(\frac{\Delta\rho}{\rho} + \frac{\Delta\beta}{\beta}\right) - \frac{\Delta\alpha'}{2\alpha'} + \frac{\Delta\alpha}{\alpha} \tag{12}$$

The coefficients of the zero offset term and the gradient term are indirectly related to changes in pressure difference $\Delta P$ and fluid saturation $\Delta S$. This is seen in the following approximation used by Landro for a combination of both fluid saturation and pressure as $$\frac{\Delta\alpha}{\alpha} \approx k_\alpha \Delta S + l_\alpha \Delta P + m_\alpha \Delta P^2 \tag{13}$$

$$\frac{\Delta\beta}{\beta} \approx k_\beta \Delta S + l_\beta \Delta P + m_\beta \Delta P^2 \tag{14}$$

$$\frac{\Delta\rho}{\rho} \approx k_\rho \Delta S. \tag{15}$$

In eqs. 10–12, the parameters k, l and m with the appropriate subscripts are derived separately. Specifically, $k_\alpha$ is determined by Landro using the Gassman equation for a homogeneous reservoir. In the present invention, $k_\alpha$ is determined in the preferred embodiment by doing a Gassman fluid substitution for only the sand component of the reservoir, assuming that the shale component does not change its properties and doing an appropriate averaging to determine the bulk properties of the reservoir. Examples of how to do this averaging are known in prior art, such as that taught by Postma (for periodic layering) or by Backus (generalization of the results of Postma). The pressure coefficients such as $l_a$, $m_a$ are determined from empirical relationships between pressure and velocity, such as by measurements. Alternatively, an empirical model such as that based on a packing of elastic spheres (this gives a 3/2 power relation between the bulk modulus and the pressure) may be used.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of a subsurface formation at a location away from a wellbore, the method comprising:
   (a) using a multicomponent resistivity logging tool for obtaining resistivity measurements indicative of properties of the formation at the wellbore;
   (b) using a processor for processing said resistivity measurements and obtaining therefrom a petrophysical model of the subsurface formation at the wellbore;
   (c) obtaining seismic measurements indicative of the parameter of interest at said location at a first time and at at least one additional time;
   (e) processing the obtained seismic measurements using the petrophysical model and determining therefrom the parameter of interest.

2. The method of claim 1 wherein the subsurface formation comprises a laminated reservoir.

3. The method of claim 1 wherein obtaining the petrophysical model further comprises:
   (i) obtaining at least one measurement made by at least one other logging tool in the wellbore, and
   (ii) processing said resistivity measurements and said at least one other measurement and determining therefrom:
      (A) a volume fraction of a sand component of the petrophysical model, and
      (B) a water saturation of said sand component.

4. The method of claim 3 further comprising obtaining acoustic measurements at the wellbore, and wherein obtaining the petrophysical model further comprises using the obtained acoustic measurements for determining a bulk modulus of the sand component and a bulk modulus of the laminated shale component.

5. The method of claim 4 further comprising obtaining a shear modulus of the sand component and a shear modulus of the laminated shale component.

6. The method of claim 1 wherein said seismic measurements comprise at least one of (i) cross-well seismic measurements, and, (ii) surface seismic measurements.

7. The method of claim 1 wherein processing the seismic measurements further comprises determining a seismic reflectivity at said location.

8. The method of claim 1 wherein processing the seismic measurements further comprises determining an amplitude variation with offset (AVO) of a seismic reflection from an upper surface of the subsurface formation.

9. The method of claim 7 wherein processing the seismic measurements further comprises determining an amplitude variation with offset (AVO) of a seismic reflection from an upper surface of the subsurface formation.

10. The method of claim 1 wherein processing the obtained seismic measurements further comprises using a fluid substitution model.

11. The method of claim 3 wherein the parameter of interest comprises a difference in saturation of water in said sand component between the first time and the at least one additional time and wherein determining the parameter of interest further comprises using a fluid substitution model.

12. The method of claim 10 wherein the fluid substitution model uses the Gassman equation.

13. The method of claim 11 wherein the parameter of interest further comprises a pressure of a fluid in the reservoir and wherein determining the parameter of interest further comprises using a relationship between a modulus of the formation and said pressure of the fluid.

14. A method of determining a parameter of interest of a laminated reservoir at a location away from a wellbore, the method comprising:
  (a) using a multicomponent resistivity logging tool in the wellbore and obtaining measurements of a horizontal conductivity and a vertical conductivity of the reservoir at the wellbore at a first time;
  (b) using a processor for processing said resistivity measurements and determining therefrom a petrophysical model of the subsurface formation at the wellbore, said petrophysical model including a volume fraction of a sand component of the reservoir and a water saturation of said sand component at the wellbore;
  (c) obtaining seismic measurements indicative of the parameter of interest at said location at a second time substantially equal to the first time and at at least one additional time;
  (d) processing the obtained seismic measurements using the petrophysical model and determining therefrom a change in fluid saturation of the reservoir at said location between the second time and the at least one additional time.

15. The method of claim 14 further comprising obtaining acoustic measurements at the wellbore and determining from said acoustic measurements and other measurements made at the wellbore at least one of (i) a bulk modulus of a sand component of the reservoir, (ii) a shear modulus of a sand component of the reservoir, (iii) a bulk modulus of a shale component of the reservoir and, (iv) a shear modulus of a shale component of the reservoir.

16. The method of claim 14 wherein said seismic measurements comprise at least one of (i) cross-well seismic measurements, and, (ii) surface seismic measurements.

17. The method of claim 14 wherein processing the seismic measurements further comprises determining an amplitude variation with offset (AVO) of a seismic reflection from an upper surface of the laminated reservoir.

18. The method of claim 14 wherein determining the change in said fluid saturation further comprises using a fluid substitution model.

19. The method of claim 18 further comprising determining a change in a pressure of a fluid in the reservoir at said location between the second time and the third time.

20. The method of claim 18 wherein the fluid substitution model uses the Gassman equation.

21. The method of claim 19 wherein determining said change in pressure further comprises using a relationship between a modulus of the formation and said pressure of the fluid.

* * * * *